(12) United States Patent
Wen et al.

(10) Patent No.: US 12,025,853 B2
(45) Date of Patent: Jul. 2, 2024

(54) 9 MILLION PIXEL BLACK LIGHT FULL-COLOR LENS

(71) Applicant: FOCtek Photonics, Inc., Fujian (CN)

(72) Inventors: Xiaofeng Wen, Fujian (CN); Yongjie Lin, Fujian (CN); Jianfang Liu, Fujian (CN); Muwang Huang, Fujian (CN); Shaoqin Guo, Fujian (CN)

(73) Assignee: FOCtek Photonics, Inc., Fuzhou (CN)

( * ) Notice: Subject to any disclaimer, the term of this patent is extended or adjusted under 35 U.S.C. 154(b) by 503 days.

(21) Appl. No.: 17/342,511

(22) Filed: Jun. 8, 2021

(65) Prior Publication Data
US 2022/0099926 A1   Mar. 31, 2022

(30) Foreign Application Priority Data

Sep. 30, 2020  (CN) .......................... 202011062240.6

(51) Int. Cl.
| | | |
|---|---|---|
| *G02B 9/64* | (2006.01) | |
| *G02B 1/11* | (2015.01) | |
| *G02B 3/00* | (2006.01) | |
| *G02B 5/04* | (2006.01) | |
| *G02B 13/00* | (2006.01) | |

(Continued)

(52) U.S. Cl.
CPC ............... *G02B 9/64* (2013.01); *G02B 1/11* (2013.01); *G02B 3/00* (2013.01); *G02B 5/04* (2013.01); *G02B 13/006* (2013.01); *G02B 13/14* (2013.01); *G02B 27/005* (2013.01); *G02B 2003/0093* (2013.01)

(58) Field of Classification Search
CPC ... G02B 1/11; G02B 3/00; G02B 5/04; G02B 9/64; G02B 13/0045; G02B 13/005; G02B 13/006; G02B 13/0065; G02B 13/008; G02B 13/14; G02B 27/0025; G02B 27/005; G02B 2003/0093
See application file for complete search history.

(56) References Cited

U.S. PATENT DOCUMENTS

2002/0005851 A1*  1/2002  Kinno .................. G02B 27/646
                                                          345/426

FOREIGN PATENT DOCUMENTS

| CN | 106405795 B | * | 1/2019 | ......... G02B 13/0045 |
| CN | 109116521 A | * | 1/2019 | |

(Continued)

*Primary Examiner* — Wyatt A Stoffa
*Assistant Examiner* — Samanvitha Sridhar

(57) ABSTRACT

The invention relates to a 9 million pixel black light full-color lens comprising a first lens, a second lens, a third lens, a fourth lens, a fifth lens, a sixth lens, a diaphragm, a seventh lens, an eighth lens, a ninth lens, a tenth lens, an eleventh lens and an equivalent prism which are sequentially arranged from front to back along a light incident direction. The invention overcomes the poor resolution with visible light and infrared light, large chromatic aberration in imaging magnification and the like of the existing black light full-color lens, improves imaging effect (i.e. resolution) with visible light and infrared bands by adopting a structure of eleven spherical lenses, cooperated with the equivalent prism, simultaneously adopting a wide-spectrum optimization design for lenses, and provides a high-resolution video stream for image fusion, consequently a bright and colored image is output in a low illumination environment is obtained.

3 Claims, 7 Drawing Sheets

(51) Int. Cl.
*G02B 13/14* (2006.01)
*G02B 27/00* (2006.01)

(56) References Cited

FOREIGN PATENT DOCUMENTS

| | | | | |
|---|---|---|---|---|
| CN | 208971615 U | | 6/2019 | |
| CN | 112526734 A | * | 3/2021 | ............... G02B 1/00 |

* cited by examiner

9 MILLION PIXEL BLACK LIGHT FULL-COLOR LENS

CROSS REFERENCE TO RELATED APPLICATIONS

The present application claims the benefit of Chinese Patent Application No. 202011062240.6 filed on Sep. 30, 2020, the contents of which are incorporated herein by reference in their entirety.

TECHNICAL FIELD

The invention relates to a 9 million pixel black light full-color lens, which is applied to the field of optical lens production.

BACKGROUND ART

Video surveillance technology has been widely used in military, security, public security and other fields. An event of a region of interest can be observed and recorded through a camera, which has a great effect on crime prevention and public safety guarantee. The camera is the key core equipment in the application of video surveillance technology, and the scene can be imaged by the image sensor inside the camera. The image quality captured by the camera is closely related to the ambient lighting conditions. When the illumination is sufficient, the camera can shoot bright and clear images. When the illumination is insufficient, for example at night, the brightness of images shot by the camera is insufficient, a large amount of image noise exists, and clear imaging cannot be realized. For video surveillance, 24-hour surveillance capabilities are required. Therefore, it is a technical problem to be solved in the technical field of video monitoring technology that how to obtain clear images at night under the condition of extremely low illumination. If light is supplemented by near infrared light, a gray image in a scene can be obtained, but important color information is lost. If white light supplement is adopted, color imaging under the condition of low illumination at night can be realized, but another problem is caused: due to the fact that the human eyes can sense white light, dazzling can be caused when high-power white light supplement is adopted, and particularly traffic accidents can be easily caused when it is used at a traffic intersection. If the light supplementing power is reduced, clear imaging cannot be realized. Therefore, most of the existing light supplementing systems adopt flash lamp illumination, but the method can only obtain images and cannot obtain video streams.

Currently, for video surveillance, there is an urgent need for improved techniques to enable lenses to acquire color images at low illumination with non-white light supplementation. For this reason, a large number of "black light" lenses and black light cameras (e.g. patent No. CN201821615050.0, etc.) using the lenses have been continuously emerging on the market. Black light is invisible light, which includes near infrared light, ultraviolet light, etc. A black light lens is matched with a camera to supplement light for illumination by using a near infrared light source, light entering the lens is divided into near infrared light and visible light by adopting a near infrared light and visible light splitting prism, an infrared photosensitive sensor and a color photosensitive sensor are adopted to respectively obtain a near infrared image and a color image, and the two images are fused to obtain a low-illumination color image. The color image effect finally obtained by the black light camera is obviously better than that of an existing star light camera based on a single image sensor.

The existing black light full-color lens has many disadvantages, such as poor resolution with visible light and infrared light, large chromatic aberration in imaging magnification and the like.

Therefore, it is urgent to provide a 9 million pixel black light full-color lens which has excellent resolution with visible light and infrared light and small chromatic aberration of image magnification.

SUMMARY OF THE INVENTION

In order to overcome the defects of poor resolution with visible light and infrared light, large chromatic aberration of imaging magnification and the like of the existing black light full-color lens, the invention provides a 9 million pixel black light full-color lens which adopts a structure of eleven spherical lenses in cooperation with an equivalent prism and simultaneously adopts a wide-spectrum optimization design for the lens, so that a good imaging effect (i.e. resolution) with visible light and infrared bands is realized. A video stream with high resolution is provided for image fusion to obtain images that are both bright and colored in low illumination environments.

The technical solution of the invention is as follows:

A 9 million pixel black light full-color lens, comprising a first lens, a second lens, a third lens, a fourth lens, a fifth lens, a sixth lens, a diaphragm, a seventh lens, an eighth lens, a ninth lens, a tenth lens, an eleventh lens and an equivalent prism which are sequentially arranged from front to back along a light incident direction, wherein the first lens is a meniscus spherical lens, the second lens is a plano-concave spherical lens, the third lens is a biconcave spherical lens, the fourth lens is a biconvex spherical lens, the third lens and the fourth lens form a closely-connected gluing group, the fifth lens is a plano-convex spherical lens, the sixth lens is a meniscus spherical lens, the fifth lens and the sixth lens form a closely-connected gluing group, the seventh lens is a meniscus spherical lens, the eighth lens is a plano-convex spherical lens, the seventh lens and the eighth lens form a closely-connected gluing group, the ninth lens is a biconvex spherical lens, the tenth lens is a biconvex spherical lens, the eleventh lens is a meniscus spherical lens, the tenth lens and the eleventh lens form a closely-connected gluing group, and the equivalent prism is flat glass of equivalent optical path with respect to a near infrared light and visible light splitting prism;

air space between the first lens and the second lens is 8.5~9.5 mm, air space between the second lens and the third lens is 3~4 mm, air space between the fourth lens and the fifth lens is 2~3 mm, air space between the sixth lens and the seventh lens is 6~7 mm, air space between the diaphragm and the sixth lens is 3~4 mm, air space between the eighth lens and the ninth lens is 0.1~0.5 mm, air space between the ninth lens and the tenth lens is 0.1~0.5 mm, and air space between the eleventh lens and the equivalent prism is 0.1~0.5 mm;

a combined focal length of the first lens, the second lens, the third lens, the fourth lens, the fifth lens and the sixth lens is −150 mm~−250 mm, and a combined focal length of the seventh lens, the eighth lens, the ninth lens, the tenth lens and the eleventh lens is 20 mm~50 mm; and The respective lenses also satisfy the following optical conditions:

$1.9 \leq n1 \leq 2.1$, $20 \leq v1 \leq 35$, $20 \leq 1S1 \leq 40$, $100 \leq 1S2 \leq 120$, 5 mm$\leq$L1$\leq$7 mm;

$1.45 \leq n2 \leq 1.75$, $45 \leq v2 \leq 65$, $9999 \leq 2S1$, $10 \leq 2S2 \leq 25$, 1 mm$\leq$L2$\leq$2 mm;

$1.65 \leq n3 \leq 1.9$, $20 \leq v3 \leq 40$, $-30 \leq 3S1 \leq -10$, $20 \leq 3S2 \leq 40$, 8 mm$\leq$L3$\leq$10 mm;

$1.9 \leq n4 \leq 2.1$, $10 \leq v4 \leq 30$, $20 \leq 4S1 \leq 40$, $-45 \leq 4S2 \leq -15$, 4 mm$\leq$L4$\leq$6 mm;

$1.4 \leq n5 \leq 1.6$, $60 \leq v5 \leq 90$, $-200 \leq 5S1 \leq -150$, $-25 \leq 5S2 \leq -10$, 4 mm$\leq$L5$\leq$6 mm;

$1.82 \leq n6 \leq 2$, $20 \leq v6 \leq 30$, $-25 \leq 6S1 \leq -10$, $-50 \leq 6S2 \leq -30$, 0.9 mm$\leq$L6$\leq$2 mm;

$1.64 \leq n7 \leq 1.85$, $20 \leq v7 \leq 30$, $-25 \leq 7S1 \leq -10$, $-160 \leq 7S2 \leq -120$, 0.5 mm$\leq$L7$\leq$2 mm;

$1.45 \leq n8 \leq 1.65$, $70 \leq v8 \leq 95$, $-160 \leq 8S1 \leq -120$, $-25 \leq 8S2 \leq -10$, 6 mm$\leq$L8$\leq$8 mm;

$1.8 \leq n9 \leq 2.0$, $15 \leq v9 \leq 20$, $100 \leq 9S1 \leq 140$, $-60 \leq 9S2 \leq -40$, 5 mm$\leq$L9$\leq$6 mm;

$1.45 \leq n10 \leq 1.6$, $70 \leq v10 \leq 85$, $30 \leq 10S1 \leq 40$, $-60 \leq 10S2 \leq -50$, 6 mm$\leq$L10$\leq$8 mm;

$1.9 \leq n11 \leq 2.1$, $20 \leq v11 \leq 30$, $-60 \leq 11S1 \leq -50$, $-150 \leq 11S2 \leq -120$, 1 mm$\leq$L11$\leq$2 mm;

$1.7 \leq n12 \leq 1.8$, $55 \leq v12 \leq 70$, $9999 \leq 12S1$, $9999 \leq 12S2$, 25 mm$\leq$L12$\leq$35 mm;

wherein n1-n11 are refractive indexes of the first lens—the eleventh lens in sequence, v1-v11 are Abbe coefficients of the first lens—the eleventh lens in sequence, 1S1-11S1 are radii of curvature of front end faces of the first lens—the eleventh lens in sequence, 1S2-11S2 are radii of curvature of rear end faces of the first lens—the eleventh lens in sequence, L1-L11 are center thicknesses of the first lens—the eleventh lens in sequence, n12 is refractive index of the equivalent prism, v12 is Abbe coefficient of the equivalent prism, 12S1 is radius of curvature of a front end face of the equivalent prism, and 12S2 is radius of curvature of a rear end face of the equivalent prism, and L12 is center thickness of the equivalent prism.

According to the 9 million pixel black light full-color lens, the shape, the focal length, the refractive index, the Abbe coefficient, the radius of curvature, the center thickness, the diaphragm position, the air space between the lens and the diaphragm, the air space between the lenses and other parameters of each lens are defined by adopting the structure of eleven spherical lenses in cooperation with the equivalent prism, and meanwhile, the lenses are optimized and designed by adopting a wide spectrum. Better imaging effects (namely resolution) with visible light and infrared bands are achieved, chromatic aberration of imaging magnification is reduced, a video stream with high resolution is provided for image fusion, and an image which is bright and colored is output in a low-illumination environment. According to the lens system, optical focal power distribution of lens equalization systems with different optical focal powers is added on the basis of a double-Gaussian-like structure. On one hand, the resolution of the system can be effectively improved, and the local sensitivity of the system caused by over concentration of local optical power is reduced. On the other hand, multivariate aberration correction is provided for the extended back focal length of the system. Due to the fact that the optical focal power distribution of the system is uniform, it allows more economical materials to be used for the optical lens materials used in the system. The 9 million pixel black light full-color lens realizes a design image plane $\varphi$ of 16 mm, the relative aperture D/f is 1.3±10%, the distortion of the full field of view is less than 5.5%, and the MTF (Modulation Transfer Function, which is dimensionless and defined as: MTF= (max intensity−min intensity)/(max intensity+min intensity)) of the full field of view is more than 0.3 at the frequency of 160 Hz. An equivalent prism is introduced into the system (wherein the equivalent optical path refers to a formula nd, wherein n is the refractive index of the prism, d is the absolute length of the prism, and n and d are the same, namely the equivalent optical path). On one hand, the whole imaging system can be simulated more practically. On the other hand, the back focal length of the system can be extended, and sufficient placing space is reserved for the back-end beam splitting prism. (The equivalent prism is a flat glass and has the same optical path thickness as the beam-splitting prism which is actually machined and assembled. Plate glass is used for replacing the equivalent prism in the design in order to simplify the design, and the space of the beam-splitting prism is occupied to provide a dimension reference for the design of the rear structure.) Preferably, the high refractive property of the equivalent prism can effectively lengthen the optical back focal length of the system, and the chromatic aberration of the system can be well corrected in cooperation with the low-dispersion glass.

The 9 million pixel black light full-color lens can achieve the following optical indexes: 1, focal length: 30 mm; 2, aperture F #=1.35; 3, Sensorsize: 1 inch; 4, resolution: no less than 9 million pixels; 5, optical back focal length: >28.5 m; 6, spectral range: 400-1100 nm, full-color fusion under low illumination can be well realized; 7, total optical length TTL is: 100 mm<TTL<125 mm.

A broadband antireflection film with a transmittance of 99.3-99.7% at a wavelength of 400-1100 nm is plated on a light passing plane of each lens.

The lens is preferably provided with the broadband antireflection film, so that the lens can collect image information with higher quality, and the lens has high transmittance in a visible light and infrared light mode.

The wavelength is 800-1100 nm.

The provision of the broadband antireflection film having a high transmittance at a preferred wavelength band can further improve the imaging quality.

Compared with the prior art, the invention has the following advantages:

1) According to the 9 million pixel black light full-color lens of the present application, the shape, the focal length, the refractive index, the Abbe coefficient, the radius of curvature, the center thickness, the diaphragm position, the air space between the lens and the diaphragm, the air space between the lenses and other parameters of each lens are defined by adopting the structure of eleven spherical lenses in cooperation with the equivalent prism, and meanwhile, the lenses are optimized and designed by adopting a wide spectrum. Better imaging effects (namely resolution) with visible light and infrared bands are achieved, a video stream with high resolution is provided for image fusion, and an image which is bright and colored is output in a low-illumination environment.

2) The lens can collect higher-quality image information by preferably arranging the broadband antireflection film, and the lens has high transmittance in a visible light and infrared light mode;

3) Preferably, the high refractive property of the equivalent prism can effectively lengthen the optical back focal length of the system, and the low dispersion glass can better correct the chromatic aberration of the system;

4) The 9 million pixel black light full-color lens provided by the invention can achieve the following optical indexes: 1, focal length: 30 mm; 2, aperture F #=1.35; 3, Sensorsize:

1 inch; 4, resolution: no less than 9 million pixels; 5, optical back focal length: >28.5 m; 6, spectral range: 400-1100 nm, low-illumination full-color fusion can be well realized.

Figure 1:
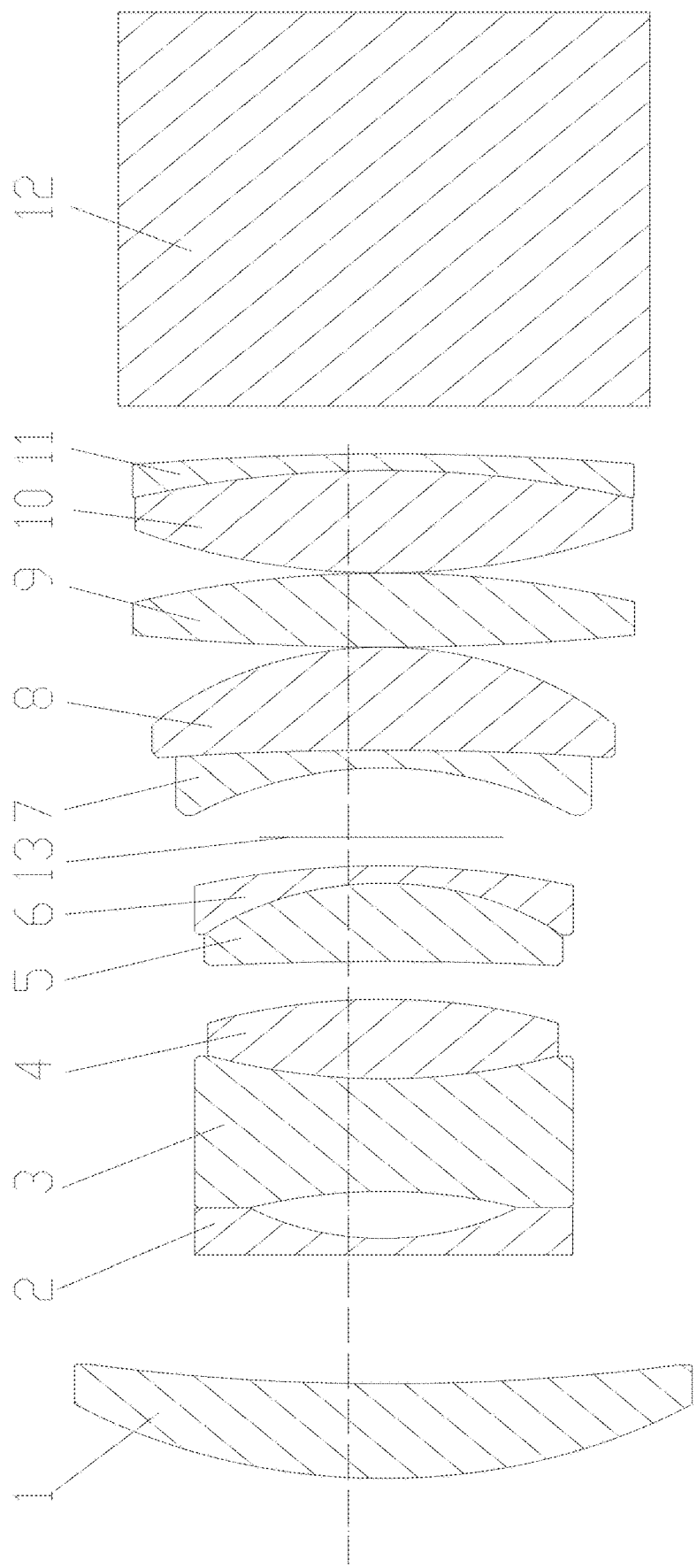
FIG. 1 is a schematic diagram showing a lens structure of a 9 million pixel black light full-color lens according to the present invention.

REFERENCE NUMERALS first lens 1, second lens 2, third lens 3, fourth lens 4, fifth lens 5, sixth lens 6, seventh lens 7, eighth lens 8, ninth lens 9, tenth lens 10, eleventh lens 11, equivalent prism 12, diaphragm 13.

DETAILED DESCRIPTION OF THE INVENTION

Hereinafter, the technical solutions of the present invention will be described in detail with reference to FIGS. 1 to 7 of the description.

Embodiment 1

As shown in FIGS. 1-7, the invention provides a 9 million pixel black light full-color lens, which comprises a first lens 1, a second lens 2, a third lens 3, a fourth lens 4, a fifth lens 5, a sixth lens 6, a diaphragm 13, a seventh lens 7, an eighth lens 8, a ninth lens 9, a tenth lens 10, an eleventh lens 11 and an equivalent prism 12 which are sequentially arranged from front to back along a light incident direction, wherein the first lens 1 is a meniscus spherical lens, the second lens 2 is a plano-concave spherical lens, the third lens 3 is a biconcave spherical lens, the fourth lens 4 is a biconvex spherical lens, the third lens 3 and the fourth lens 4 form a closely-connected gluing group, the fifth lens 5 is a plano-convex spherical lens, the sixth lens 6 is a meniscus spherical lens, the fifth lens 5 and the sixth lens 6 form a closely-connected gluing group, the seventh lens 7 is a meniscus spherical lens, the eighth lens 8 is a plano-convex spherical lens, the seventh lens 7 and the eighth lens 8 form a closely-connected gluing group, the ninth lens 9 is a biconvex spherical lens, the tenth lens 10 is a biconvex spherical lens, the eleventh lens 11 is a meniscus spherical lens, the tenth lens 10 and the eleventh lens 11 form a closely-connected gluing group, and the equivalent prism 12 is flat glass of equivalent optical path with respect to a near infrared light and visible light splitting prism;

air space between the first lens 1 and the second lens 2 is 9 mm, air space between the second lens 2 and the third lens 3 is 3.5 mm, air space between the fourth lens 4 and the fifth lens 5 is 2.5 mm, air space between the sixth lens 6 and the seventh lens 7 is 6.5 mm, air space between the diaphragm 13 and the sixth lens 6 is 3.5 mm, air space between the eighth lens 8 and the ninth lens 9 is 0.3 mm, air space between the ninth lens 9 and the tenth lens 10 is 0.3 mm, and air space between the eleventh lens 11 and the equivalent prism 12 is 0.3 mm;

a combined focal length of the first lens 1, the second lens 2, the third lens 3, the fourth lens 4, the fifth lens 5 and the sixth lens 6 is −200 mm, and a combined focal length of the seventh lens 7, the eighth lens 8, the ninth lens 9, the tenth lens 10 and the eleventh lens 11 is 30 mm; and each lens also satisfies the following optical conditions:
n1=2, v1=30, 1S1=30, 1S2=110, L1=6 mm;
1n2=1.6, v2=60, 2S1=12000, 2S2=20, L2=1.5 mm;
n3=1.8, v3=30, 3S1=−20, 3S2=30, L3=9 mm;
n4=2, v4=20, 4S1=30, −4S2=−30, L4=5 mm;
n5=1.5, v5=70, 5S1=−180, 5S2=−15, L5=5 mm;
n6=1.9, v6=25, 6S1=−20, 6S2=−45, L6=1.6 mm;
n7=1.7, v7=25, 7S1=−20, 7S2=−140, L7=1.2 mm;
n8=1.5, v8=80, 8S1=−140, 8S2=−20, L8=7 mm;
n9=1.9, v9=18, 9S1=120, 9S2=−50, L9=5.5 mm;
n10=1.5, v10=75, 10S1=35, 10S2=−55, L10=7 mm;
11=2.0, v11=25, 11S1=−55, 11S2=−130, L11=1.5 mm;
n12=1.7, v12=60, 12S1=12000, 12S2=12000, L12=30 mm;

wherein n1-n11 are refractive indexes of the first lens 1—the eleventh lens 11 in sequence, v1-v11 are Abbe coefficients of the first lens 1—the eleventh lens 11 in sequence, 1S1-11S1 are radii of curvature of front end faces of the first lens 1—the eleventh lens 11 in sequence, 1S2-11S2 are radii of curvature of rear end faces of the first lens 1—the eleventh lens 11 in sequence, L1-L11 are center thicknesses of the first lens 1—the eleventh lens 11 in sequence, n12 is refractive index of the equivalent prism 12, v12 is Abbe coefficient of the equivalent prism 12, 12S1 is radius of curvature of a front end face of the equivalent prism 12, and 12S2 is radius of curvature of a rear end face of the equivalent prism 12, and L12 is center thickness of the equivalent prism 12.

A broadband antireflection film with a transmittance of 99.5% at a wavelength of 800 nm is plated on a light passing plane of each lens.

The wavelength is 1000 nm.

Embodiment 2

As shown in FIGS. 1-7, a 9 million pixel black light full-color lens according to the present invention comprises a first lens 1, a second lens 2, a third lens 3, a fourth lens 4, a fifth lens 5, a sixth lens 6, a diaphragm 13, a seventh lens 7, an eighth lens 8, a ninth lens 9, a tenth lens 10, an eleventh lens 11 and an equivalent prism 12 which are sequentially arranged from front to back along a light incident direction, wherein the first lens 1 is a meniscus spherical lens, the second lens 2 is a plano-concave spherical lens, the third lens 3 is a biconcave spherical lens, the fourth lens 4 is a biconvex spherical lens, the third lens 3 and the fourth lens 4 form a closely-connected gluing group, the fifth lens 5 is a plano-convex spherical lens, the sixth lens 6 is a meniscus spherical lens, the fifth lens 5 and the sixth lens 6 form a closely-connected gluing group, the seventh lens 7 is a meniscus spherical lens, the eighth lens 8 is a plano-convex spherical lens, the seventh lens 7 and the eighth lens 8 form a closely-connected gluing group, the ninth lens 9 is a biconvex spherical lens, the tenth lens 10 is a biconvex spherical lens, the eleventh lens 11 is a meniscus spherical lens, the tenth lens 10 and the eleventh lens 11 form a closely-connected gluing group, and the equivalent prism 12 is flat glass of equivalent optical path with respect to a near infrared light and visible light splitting prism;

air space between the first lens 1 and the second lens 2 is 8.5 mm, air space between the second lens 2 and the third lens 3 is 3 mm, air space between the fourth lens 4 and the fifth lens 5 is 2 mm, air space between the sixth lens 6 and the seventh lens 7 is 6 mm, air space between the diaphragm 13 and the sixth lens 6 is 3 mm, air space between the eighth lens 8 and the ninth lens 9 is 0.1 mm, air space between the ninth lens 9 and the tenth lens 10 is 0.1 mm, and air space between the eleventh lens 11 and the equivalent prism 12 is 0.1 mm;

a combined focal length of the first lens 1, the second lens 2, the third lens 3, the fourth lens 4, the fifth lens 5 and the sixth lens 6 is −150 mm, and a combined focal length of the seventh lens 7, the eighth lens 8, the ninth lens 9, the tenth lens 10 and the eleventh lens 11 is 20 mm; and each lens also satisfies the following optical conditions:
$n1=1.9$, $v1=20$, $1S1=20$, $1S2=100$, $L1=5$ mm;
$n2=1.45$, $v2=45$, $2S1=9999$, $2S2=10$, $L2=1$ mm;
$n3=1.65$, $v3=20$, $3S1=-30$, $3S2=20$, $L3=8$ mm;
$n4=1.9$, $v4=10$, $4S1=20$, $4S2=-45$, $L4=4$ mm;
$n5=1.4$, $v5=60$, $5S1=-200$, $5S2=-25$, $L5=4$ mm;
$n6=1.82$, $v6=20$, $6S1=-25$, $6S2=-50$, $L6=0.9$ mm;
$n7=1.64$, $v7=20$, $7S1=-25$, $7S2=-160$, $L7=0.5$ mm;
$n8=1.45$, $v8=70$, $8S1=-160$, $8S2=-25$, $L8=6$ mm;
$n9=1.8$, $v9=15$, $9S1=100$, $9S2=-60$, $L9=5$ mm;
$n10=1.45$, $v10=70$, $1051=30$, $10S2=-60$, $L10=6$ mm;
$n11=1.9$, $v11=20$, $11S1=-60$, $11S2=-150$, $L11=1$ mm;
$n12=1.8$, $v12=55$, $12S1=9999$, $12S2=9999$, $L12=25$ mm;

wherein n1-n11 are refractive indexes of the first lens 1—the eleventh lens 11 in sequence, v1-v11 are Abbe coefficients of the first lens 1—the eleventh lens 11 in sequence, 1S1-11S1 are radii of curvature of front end faces of the first lens 1—the eleventh lens 11 in sequence, 1S2-11S2 are radii of curvature of rear end faces of the first lens 1—the eleventh lens 11 in sequence, L1-L11 are center thicknesses of the first lens 1—the eleventh lens 11 in sequence, n12 is refractive index of the equivalent prism 12, v12 is Abbe coefficient of the equivalent prism 12, 12S1 is radius of curvature of a front end face of the equivalent prism 12, and 12S2 is radius of curvature of a rear end face of the equivalent prism 12, and L12 is center thickness of the equivalent prism 12.

A broadband antireflection film with a transmittance of 99.3% at a wavelength of 400 nm is plated on a light passing plane of each lens.

The wavelength is 800 nm.

Embodiment 3

As shown in FIGS. 1-7, the invention provides a 9 million pixel black light full-color lens which comprises a first lens 1, a second lens 2, a third lens 3, a fourth lens 4, a fifth lens 5, a sixth lens 6, a diaphragm 13, a seventh lens 7, an eighth lens 8, a ninth lens 9, a tenth lens 10, an eleventh lens 11 and an equivalent prism 12 which are sequentially arranged from front to back along a light incident direction, wherein the first lens 1 is a meniscus spherical lens, the second lens 2 is a plano-concave spherical lens, the third lens 3 is a biconcave spherical lens, the fourth lens 4 is a biconvex spherical lens, the third lens 3 and the fourth lens 4 form a closely-connected gluing group, the fifth lens 5 is a plano-convex spherical lens, the sixth lens 6 is a meniscus spherical lens, the fifth lens 5 and the sixth lens 6 form a closely-connected gluing group, the seventh lens 7 is a meniscus spherical lens, the eighth lens 8 is a plano-convex spherical lens, the seventh lens 7 and the eighth lens 8 form a closely-connected gluing group, the ninth lens 9 is a biconvex spherical lens, the tenth lens 10 is a biconvex spherical lens, the eleventh lens 11 is a meniscus spherical lens, the tenth lens 10 and the eleventh lens 11 form a closely-connected gluing group, and the equivalent prism 12 is flat glass of equivalent optical path with respect to a near infrared light and visible light splitting prism;

air space between the first lens 1 and the second lens 2 is 9.5 mm, air space between the second lens 2 and the third lens 3 is 4 mm, air space between the fourth lens 4 and the fifth lens 5 is 3 mm, air space between the sixth lens 6 and the seventh lens 7 is 7 mm, air space between the diaphragm 13 and the sixth lens 6 is 4 mm, air space between the eighth lens 8 and the ninth lens 9 is 0.5 mm, air space between the ninth lens 9 and the tenth lens 10 is 0.5 mm, and air space between the eleventh lens 11 and the equivalent prism 12 is 0.5 mm;

a combined focal length of the first lens 1, the second lens 2, the third lens 3, the fourth lens 4, the fifth lens 5 and the sixth lens 6 is −250 mm, and a combined focal length of the seventh lens 7, the eighth lens 8, the ninth lens 9, the tenth lens 10 and the eleventh lens 11 is 50 mm; and each lens also satisfies the following optical conditions:
$n1=2.1$, $v1=35$, $1S1=40$, $1S2=120$, $L1=7$ mm;
$n2=1.75$, $v2=65$, $2S1=10000$, $2S2=25$, $1L2=2$ mm;
$n3=1.9$, $v3=40$, $3S1=-10$, $3S2=40$, $L3=10$ mm;
$n4=2.1$, $v4=30$, $4S1=40$, $4S2=-15$, $L4=6$ mm;
$n5=1.6$, $v5=90$, $5S1=-150$, $5S2=-10$, $L5=6$ mm;
$n6=2$, $v6=30$, $6S1=-10$, $6S2=-30$, $L6=2$ mm;
$n7=1.85$, $v7=30$, $7S1=-10$, $7S2=-120$, $L7=2$ mm;
$n8=1.65$, $v8=95$, $8S1=-120$, $8S2=-10$, $L8=8$ mm;
$n9=2.0$, $v9=20$, $9S1=140$, $9S2=-40$, $L9=6$ mm;
$n10=1.6$, $v10=85$, $10S1=40$, $10S2=-50$, $L10=8$ mm;
$n11=2.1$, $v11=30$, $1151=-50$, $11S2=-120$, $L11=2$ mm;
$n12=1.75$, $v12=70$, $12S1=10000$, $12S2=10000$, $L12=35$ mm;

wherein n1-n11 are refractive indexes of the first lens 1—the eleventh lens 11 in sequence, v1-v11 are Abbe coefficients of the first lens 1—the eleventh lens 11 in sequence, 1S1-11S1 are radii of curvature of front end faces of the first lens 1—the eleventh lens 11 in sequence, 1S2-1152 are radii of curvature of rear end faces of the first lens 1—the eleventh lens 11 in sequence, L1-L11 are center thicknesses of the first lens 1—the eleventh lens 11 in sequence, n12 is refractive index of the equivalent prism 12, v12 is Abbe coefficient of the equivalent prism 12, 12S1 is radius of curvature of a front end face of the equivalent prism 12, and 12S2 is radius of curvature of a rear end face of the equivalent prism 12, and L12 is center thickness of the equivalent prism 12.

A broadband antireflection film with a transmittance of 99.7% at a wavelength of 1100 nm is plated on a light passing plane of each lens.

The wavelength is 1100 nm.

Figure 2:
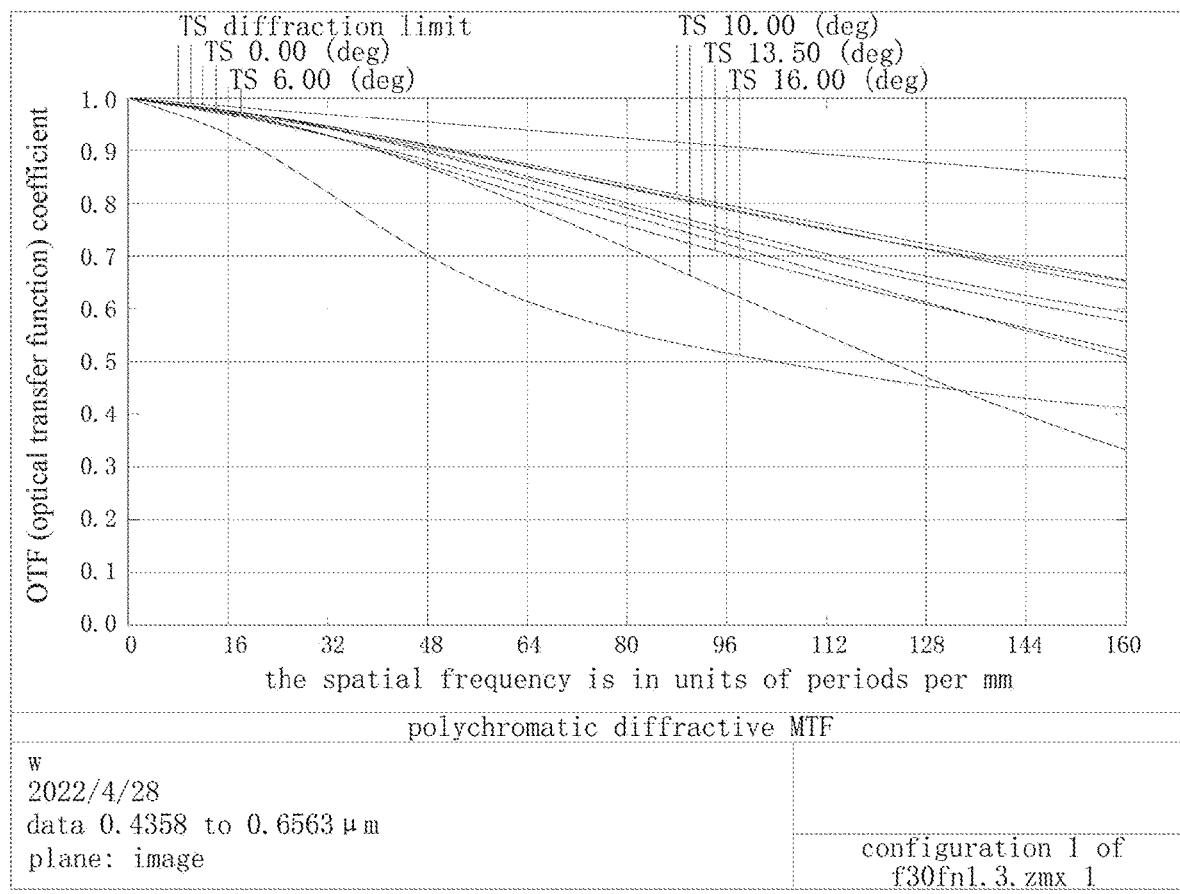
FIG. 2 is a visible light MTF diagram of embodiment 1 of a 9 million pixel black light full-color lens of the present invention.

Description of the Words in Figures:

As can be seen from FIG. 2, the center MTF of the 9 million pixel black light full-color lens of the present invention is greater than 0.3 at 160 lp/mm, the edge MTF is greater than 0.3 at 125 lp/mm, and the resolution can reach 12 MP super-high pixels.

Figure 3:
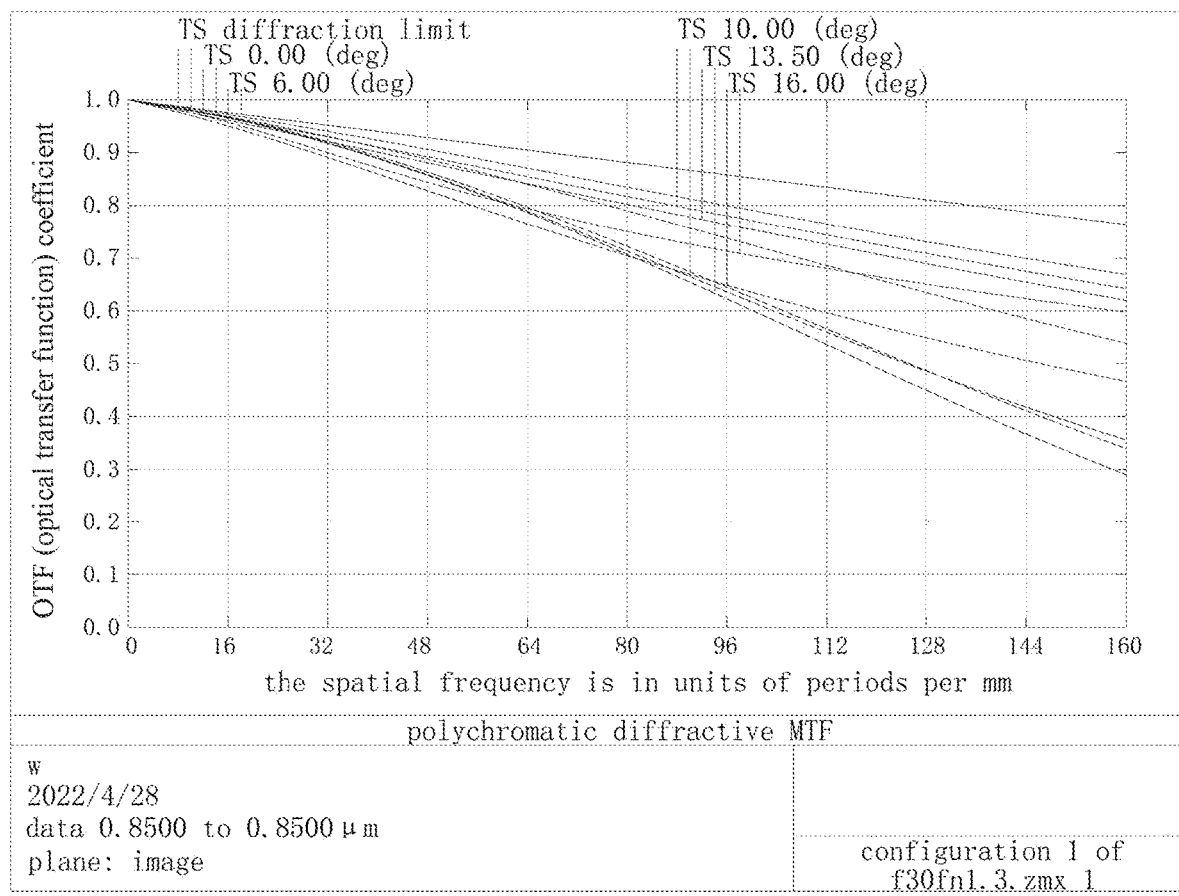
FIG. 3 is an infrared mode MTF diagram of embodiment 1 of a 9 million pixel black light full-color lens of the present invention.

As can be seen from FIG. 3, the center MTF of the 9 million pixel black light full-color lens of the present invention is greater than 0.3 at 160 lp/mm, the edge MTF is greater than 0.3 at 125 lp/mm, and the resolution can reach 12 MP super-high pixels.

Figure 4:
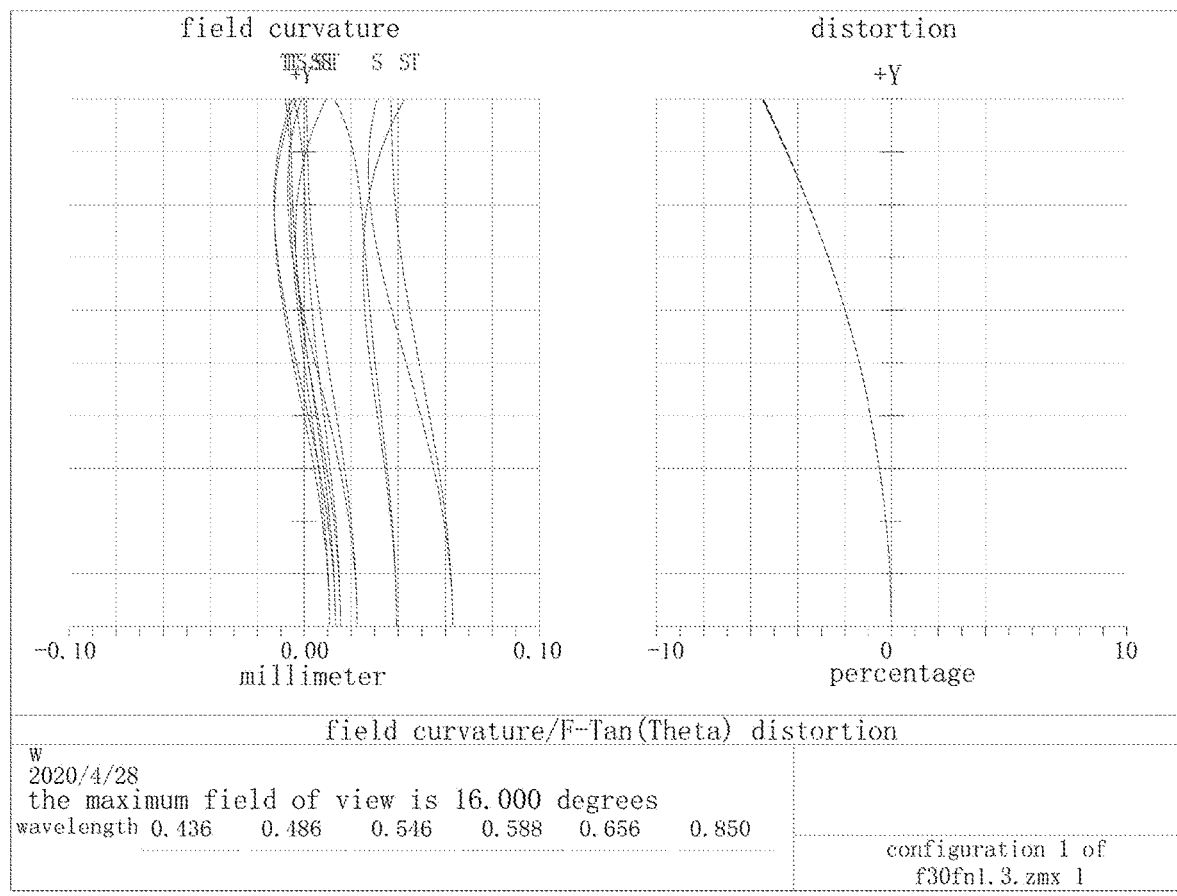
FIG. 4 is a distortion diagram of embodiment 1 of a 9 million pixel black light full-color lens of the present invention.

As can be seen from FIG. 4, the 9 million pixel black light full-color lens has small distortion (the distortion of the full field of view is less than 5%), different spectra of field curves are less than 0.02 mm, and the 9 million pixel black light full-color lens is suitable for mass production.

Figure 5:
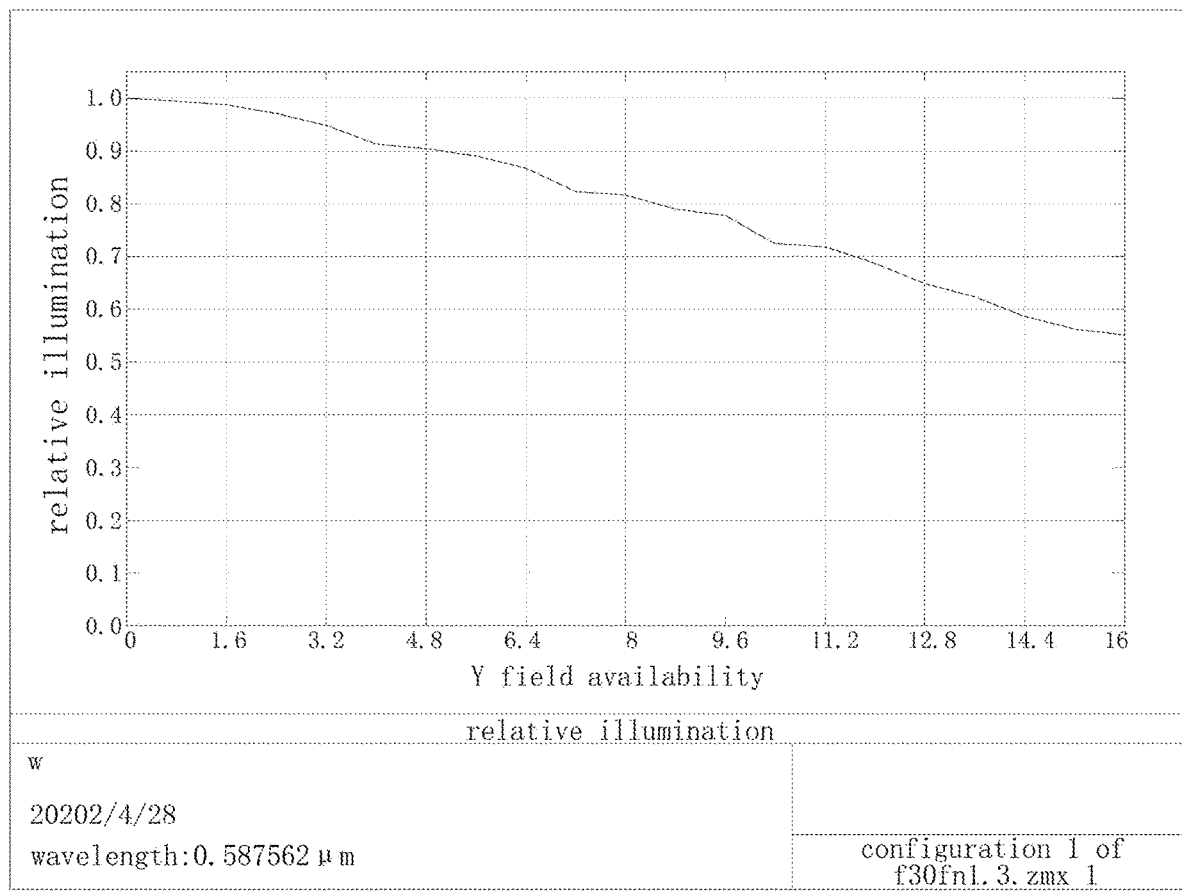
FIG. 5 is a relative illumination diagram of embodiment 1 of a 9 million pixel black light full-color lens of the present invention.

As can be seen from FIG. 5, the 9 million pixel black light full-color lens has good relative brightness, and the relative illumination in full field of view is more than 55%.

Figure 6:
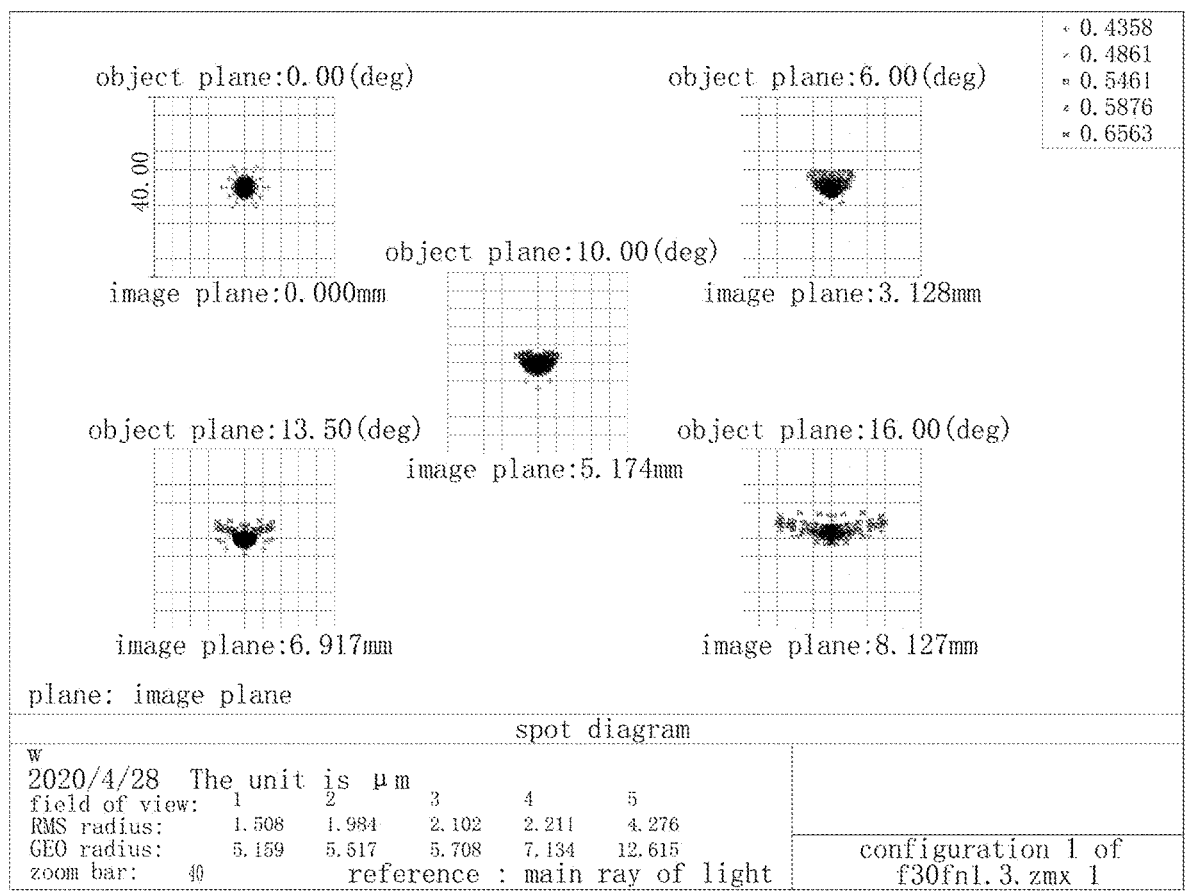
FIG. 6 is a visible light dispersion speckle pattern of embodiment 1 of a 9 million pixel black light full-color lens of the present invention.

As can be seen from FIG. 6, the 9 million pixel black light full-color lens is small in dispersion circle in a visible light mode, and the chromatic aberration correction in the full field of view is better.

Figure 7:
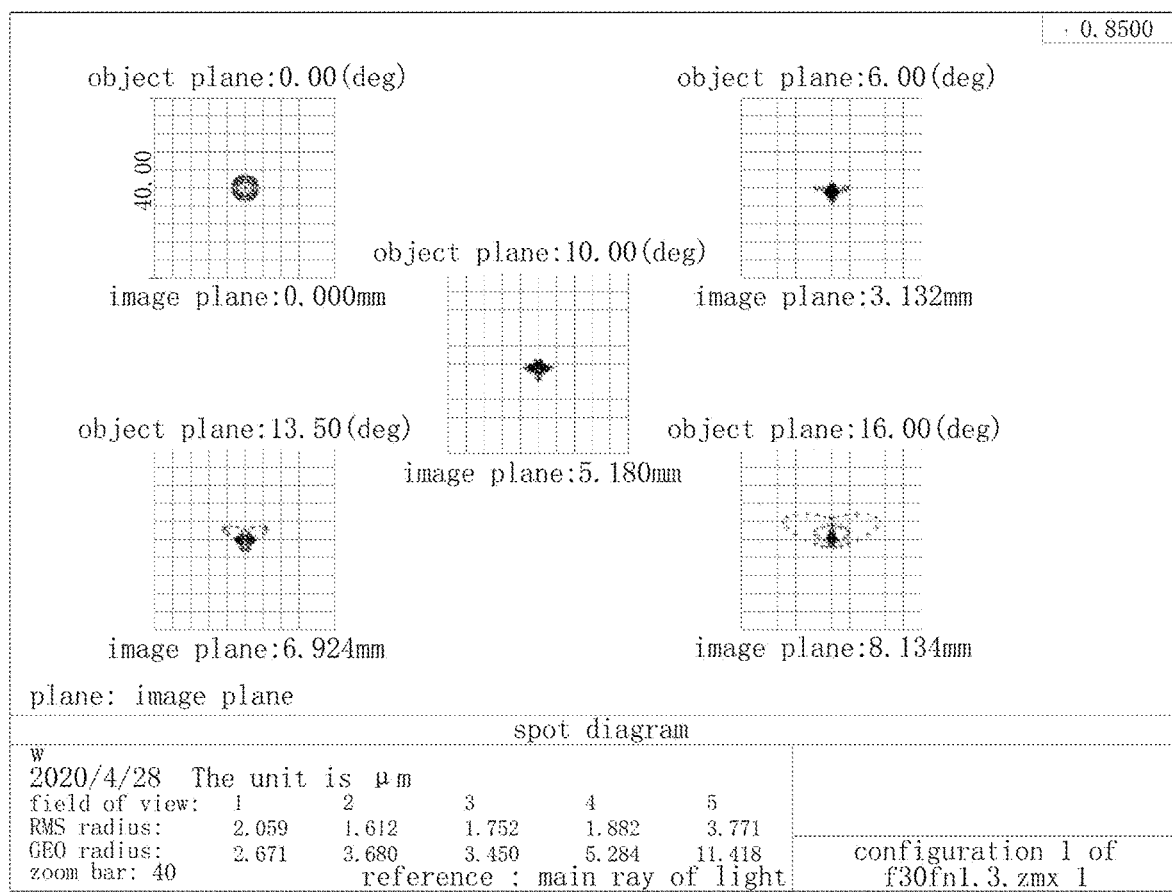
FIG. 7 is an infrared light dispersion speckle diagram of embodiment 1 of a 9 million pixel black light full-color lens of the present invention.

As can be seen from FIG. 7, the 9 million pixel black light full-color lens of the present invention is small in dispersion circle in an infrared mode and is similar to a visible path, and the fusion effect of the two paths is good.

The visible light MTF pattern, infrared mode MTF pattern, distortion pattern, relative illumination pattern, visible light dispersion pattern, and infrared light dispersion spectacle pattern of the other embodiments are similar to those of FIG. 1.

Therefore, the 9 million pixel black light full-color lens is small in dispersion circle under visible light and infrared light, the imaging quality under visible light and infrared light can meet the requirements of 9 million pixels, the distortion is small, the field curvature is low, and the relative brightness is large.

The 9 million pixel black light full-color lens of the present invention is not limited to the above-described embodiments only, and any modifications or substitutions according to the principles of the present invention are intended to be within the scope of the present invention.

What is claimed is:

1. A lens system, comprising a first lens (1), a second lens (2), a third lens (3), a fourth lens (4), a fifth lens (5), a sixth lens (6), a diaphragm (13), a seventh lens (7), an eighth lens (8), a ninth lens (9), a tenth lens (10), an eleventh lens (11) and an equivalent prism (12) which are sequentially arranged from front to back along a light incident direction,
wherein the first lens (1) is a meniscus spherical lens, the second lens (2) is a plano-concave spherical lens, the third lens (3) is a biconcave spherical lens, the fourth lens (4) is a biconvex spherical lens, the third lens (3) and the fourth lens (4) are adhered together, the fifth lens (5) is a plano-convex spherical lens, the sixth lens (6) is a meniscus spherical lens, the fifth lens (5) and the sixth lens (6) form a closely-connected gluing group, the seventh lens (7) is a meniscus spherical lens, the eighth lens (8) is a plano-convex spherical lens, the seventh lens (7) and the eighth lens (8) form a closely-connected gluing group, the ninth lens (9) is a biconvex spherical lens, the tenth lens (10) is a biconvex spherical lens, the eleventh lens (11) is a meniscus spherical lens, the tenth lens (10) and the eleventh lens (11) form a closely-connected gluing group, and the equivalent prism (12) is flat glass of equivalent optical path with respect to a near infrared light and visible light splitting prism;

air space between the first lens (1) and the second lens (2) is 8.5~9.5 mm, air space between the second lens (2) and the third lens (3) is 3~4 mm, air space between the fourth lens (4) and the fifth lens (5) is 2~3 mm, air space between the sixth lens (6) and the seventh lens (7) is 6~7 mm, air space between the diaphragm (13) and the sixth lens (6) is 3~4 mm, air space between the eighth lens (8) and the ninth lens (9) is 0.1~0.5 mm, air space between the ninth lens (9) and the tenth lens (10) is 0.1~0.5 mm, and air space between the eleventh lens (11) and the equivalent prism (12) is 0.1~0.5 mm;

a combined focal length of the first lens (1), the second lens (2), the third lens (3), the fourth lens (4), the fifth lens (5) and the sixth lens (6) is −150 mm~−250 mm, and a combined focal length of the seventh lens (7), the eighth lens (8), the ninth lens (9), the tenth lens (10) and the eleventh lens (11) is 20 mm~50 mm; and each lens also satisfies the following optical conditions:
$1.9 \leq n1 \leq 2.1$, $20 \leq v1 \leq 35$, $20 \leq 1S1 \leq 40$, $100 \leq 1S2 \leq 120$, $5 \text{ mm} \leq L1 \leq 7 \text{ mm}$;
$1.45 \leq n2 \leq 1.75$, $45 \leq v2 \leq 65$, $9999 \leq 2S1$, $10 \leq 2S2 \leq 25$, $1 \text{ mm} \leq L2 \leq 2 \text{ mm}$;
$1.65 \leq n3 \leq 1.9$, $20 \leq v3 \leq 40$, $-30 \leq 3S1 \leq -10$, $20 \leq 3S2 \leq 40$, $8 \text{ mm} \leq L3 \leq 10 \text{ mm}$;
$1.9 \leq n4 \leq 2.1$, $10 \leq v4 \leq 30$, $20 \leq 4S1 \leq 40$, $-45 \leq 4S2 \leq -15$, $4 \text{ mm} \leq L4 \leq 6 \text{ mm}$;
$1.4 \leq n5 \leq 1.6$, $60 \leq v5 \leq 90$, $-200 \leq 5S1 \leq -150$, $-25 \leq 5S2 \leq -10$, $4 \text{ mm} \leq L5 \leq 6 \text{ mm}$;
$1.82 \leq n6 \leq 2$, $20 \leq v6 \leq 30$, $-25 \leq 6S1 \leq -10$, $-50 \leq 6S2 \leq -30$, $0.9 \text{ mm} \leq L6 \leq 2 \text{ mm}$;
$1.64 \leq n7 \leq 1.85$, $20 \leq v7 \leq 30$, $-25 \leq 7S1 \leq -10$, $-160 \leq 7S2 \leq -120$, $0.5 \text{ mm} \leq L7 \leq 2 \text{ mm}$;
$1.45 \leq n8 \leq 1.65$, $70 \leq v8 \leq 95$, $-160 \leq 8S1 \leq -120$, $-25 \leq 8S2 \leq -10$, $6 \text{ mm} \leq L8 \leq 8 \text{ mm}$;
$1.8 \leq n9 \leq 2.0$, $15 \leq v9 \leq 20$, $100 \leq 9S1 \leq 140$, $-60 \leq 9S2 \leq -40$, $5 \text{ mm} \leq L9 \leq 6 \text{ mm}$;
$1.45 \leq n10 \leq 1.6$, $70 \leq v10 \leq 85$, $30 \leq 10S1 \leq 40$, $-60 \leq 10S2 \leq -50$, $6 \text{ mm} \leq L10 \leq 8 \text{ mm}$;
$1.9 \leq n11 \leq 2.1$, $20 \leq v11 \leq 30$, $-60 \leq 11S1 \leq -50$, $-150 \leq 11S2 \leq -120$, $1 \text{ mm} \leq L11 \leq 2 \text{ mm}$;
$1.7 \leq n12 \leq 1.8$, $55 \leq v12 \leq 70$, $9999 \leq 12S1$, $9999 \leq 12S2$, $25 \text{ mm} \leq L12 \leq 35 \text{ mm}$;

wherein n1-n11 are refractive indexes of the first lens (1)—the eleventh lens (11) in sequence, v1-v11 are Abbe coefficients of the first lens (1)—the eleventh lens (11) in sequence, 1S1-11S1 are radii of curvature of front end faces of the first lens (1)—the eleventh lens (11) in sequence, 1S2-11S2 are radii of curvature of rear end faces of the first lens (1)—the eleventh lens (11) in sequence, L1-L11 are center thicknesses of the first lens (1)—the eleventh lens (11) in sequence, n12 is refractive index of the equivalent prism (12), v12 is Abbe coefficient of the equivalent prism (12), 12S1 is radius of curvature of a front end face of the equivalent prism (12), and 12S2 is radius of curvature of a rear end face of the equivalent prism (12), and L12 is center thickness of the equivalent prism (12).

2. The lens system according to claim 1, wherein a broadband antireflection film with a transmittance of 99.3-99.7% at a wavelength of 400-1100 nm is plated on a light passing plane of each lens.

3. The lens system according to claim 2, wherein the wavelength is 800-1100 nm.

* * * * *